United States Patent [19]

Yamamoto

[11] 4,132,942

[45] Jan. 2, 1979

[54] DEVICE FOR DETECTING THE OVERDISCHARGE OF BATTERY

[75] Inventor: Mitsuo Yamamoto, Kakegawa, Japan

[73] Assignee: Ishikawa Tekko Kabushiki Kaisha, Tokyo, Japan

[21] Appl. No.: 811,052

[22] Filed: Jun. 29, 1977

Related U.S. Application Data

[62] Division of Ser. No. 688,688, May 21, 1976, Pat. No. 4,055,708.

[30] Foreign Application Priority Data

May 27, 1975 [JP] Japan .................................. 50-63612
Jan. 16, 1976 [JP] Japan .................................... 51-4373

[51] Int. Cl.² .......................... H02J 7/14; H03G 3/00
[52] U.S. Cl. ........................................ 320/13; 290/50; 307/10 BP; 340/636
[58] Field of Search ....................... 320/48, 13, 43, 47, 320/54, 14; 307/10 BP; 290/50; 324/29.5; 340/249

[56] References Cited

U.S. PATENT DOCUMENTS 1,168,263  1/1916  Flanders .................................. 320/43
3,474,296  10/1969  Rickey .............................. 320/40 X
3,721,887  3/1973  Nickerson ............................... 320/13

FOREIGN PATENT DOCUMENTS 2521462  5/1975  Fed. Rep. of Germany ...... 307/10 BP

Primary Examiner—Robert J. Hickey
Attorney, Agent, or Firm—James E. Nilles

[57] ABSTRACT

A system includes a prime mover, such as an automobile engine, having operative and inoperative states; an electrical load; an accumulator or battery for operating the load; and a control system for the battery. The control system includes: a self-holding keeping relay having contacts in circuit between the battery and the load and having a resetting coil to control energization of the load from the battery; a warning device; a detecting device and a detecting switch controlled thereby responsive to a fault condition in the battery; and a changeover switch responsive to the operative state of the prime mover for operating the detecting switch. The control system is responsive to a fault condition in the battery, such as overdischarge or low electrolyte, to prevent energization of the load when the prime mover is inoperative and to enable energization of the load and operation of a warning signal device when the prime mover is operative.

17 Claims, 20 Drawing Figures

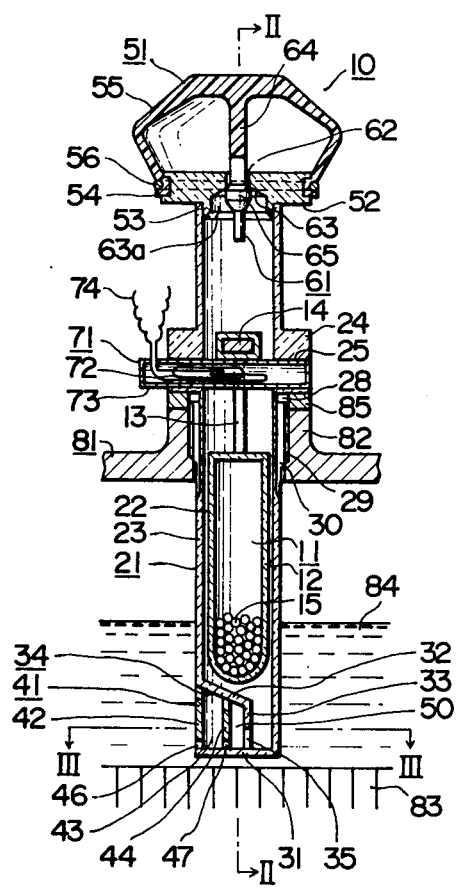
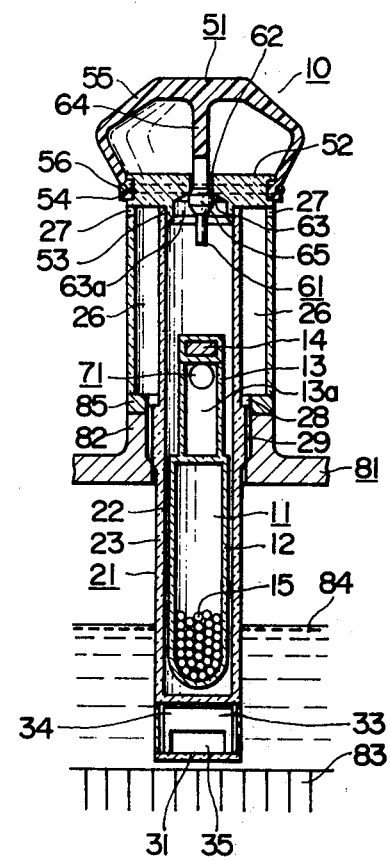
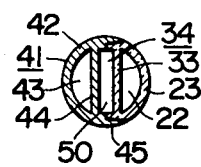

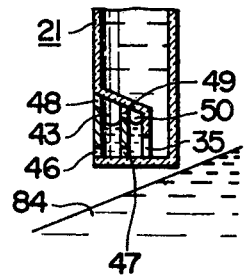
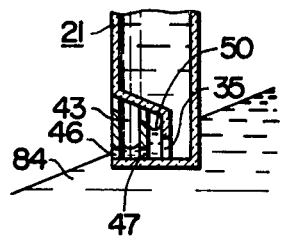
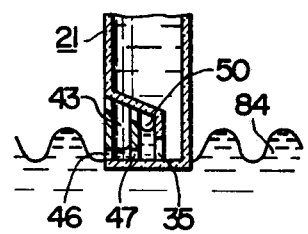
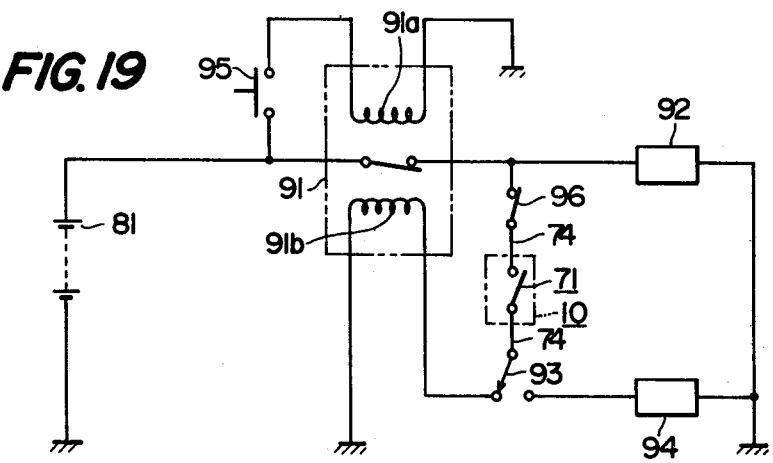
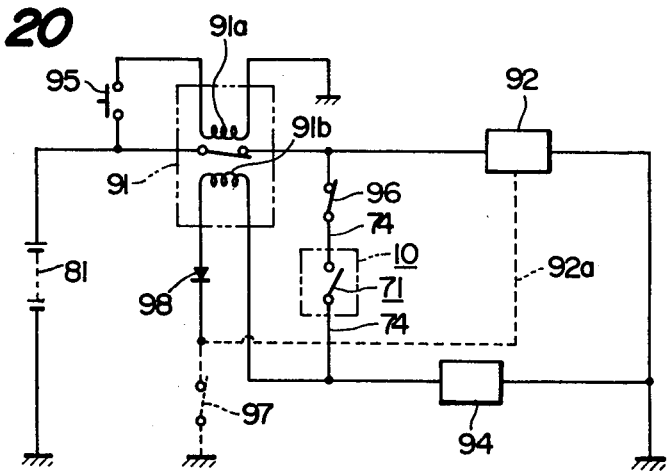

DEVICE FOR DETECTING THE OVERDISCHARGE OF BATTERY

REFERENCE TO RELATED CO-PENDING APPLICATION

This application is a divisional of patent application U.S. Ser. No. 688,688; Filed May 21, 1976, now U.S. Pat. No. 4,055,708, issued Oct. 25, 1977.

The present invention relates to a device capable of detecting the discharging state of an accumulator as well as the surface level of the electrolyte contained in the accumulator.

When a lead accumulator or battery is repeatedly overcharged and overdischarged, the plate activating material will fall off or the plates will become curved. Further, when the electrolyte is reduced sufficiently to expose the plates above the surface level of the electrolyte, sulfate will be produced at the portion of the plate at which the surface of the electrolyte crosses the plates to thereby extremely degrade the performance and life of the accumulator. Furthermore, when the accumulator is used as a power source for an emergency, the accumulator cannot be left discharged.

Still further, when the accumulator for the prime mover of a car or the like is overdischarged or is filled with a short volume of electrolyte, it is desirable from the viewpoint of safety to quickly stop the current supply from the accumulator and to give a proper treatment to the accumulator. However, in practice the changes caused in the accumulator are often discovered by the fact that the prime mover can not be driven, so that it is of no use for an emergency and the life of the accumulator is extremely short. Particularly, in the case of an accumulator used for a car, the performance of the accumulator is progressively degraded by a leak which can not be sensed by the fuse, or by the provision of too many optical parts, or by the drop of the surface level of the electrolyte contained in the accumulator. Performance is further degraded by forgetting to switch off the lamps, or by any accident in the line of charging circuit, thereby causing the accumulator to be overdischarged in a short time period.

Conventionally, maintenance of the accumulator has been attained by measuring the specific gravity of the electrolyte (or dilute sulfuric acid) which changes proportional to the charging or discharging volume of the accumulator, or by checking the surface level of the electrolyte, but it has been very troublesome. On the other hand, automatic maintenance of the accumulator has been attained by a device using a floating member to detect the overdischarge of the accumulator, or by a device for maintaining the surface level of the electrolyte. However, such devices which are susceptible to change or vibration in the surface level of the electrolyte have not been suitable for use in cars or ships. Further, such devices integrally incorporated in an accumulator could not be attached to other conventional accumulators.

An object of the present invention is to provide a detecting device of simple construction capable of detecting the overdischarge of an accumulator as well as the surface level of the electrolyte contained in the accumulator, said detecting device enabling automatic maintenance of the accumulator, low manufacturing cost, easy attachment to conventional accumulators, easy handling, and further enabling overdischarge of the accumulator and the surface level of electrolyte contained in the accumulator to be detected without any influence of a change or vibration in the surface level of the electrolyte by using the hydrodynamic property of the electrolyte and enabling maintenance of the accumulator to be attained through remote control, so that said device has a wide range of usage in cars, ships or the like and a great value in the industrial field.

Another object of the present invention is to provide a detecting device of high reliability enabling any danger of erroneous operation of the device caused by a special condition to be avoided when the device is used, for example, in the accumulator of a car.

A further object of the present invention is to provide a detecting device capable of protecting the accumulator as well as maintaining the performance of the accumulator wherein any accident of the accumulator can be electrically detected to stop the current supply from the accumulator when the prime mover is not being operated and to give a warning when the prime mover is being operated.

The detecting device of the present invention intended to be attached to an accumulator comprises a floating member having a magnetic material such as permanent magnet or iron, a case housing the floating member and having holes through which the electrolyte passes, a means for sucking the electrolyte into the case and being attached to the case, and a magnetic sensing switch being rendered operative by the displacement of the magnetic material to detect the overdischarge of the accumulator as well as the surface level of the electrolyte contained in the accumulator and to provide an electric output. When the specific gravity of the electrolyte contained in the accumulator decreases to a predetermined value, the floating member is lowered or when the surface level of the electrolyte contained in the accumulator falls below a predetermined level, the electrolyte contained in the case, to which the device of the present invention is attached, comes out of the case to lower the floating member, so that the magnetic material or the permanent magnet connected to the floating member may render the magnetic sensing switch operative to apply an electric output to a warning means or the like.

The device of the present invention having a single or plural chambers provided in the case and having holes and cut-away portions provided at the upper and lower ends of the chamber partitions, said holes and cut-away portions communicating between the inside of the case and the outside of the case, can enhance its reliability and its proofness to vibration in the traverse direction by preventing leakage of the electrolyte contained in the case and penetration of bubbles of hydrogen gas and air into the case.

When a plurality of chambers are provided in the case and the holes and cut-away portions are provided alternately in the upper and lower ends of the chamber partitions (that is, each of the holes and cut-away portions is located, respectively, so as to form a non-linear line), the electrolyte, hydrogen gas or air cannot flow in straight line, so that any influence which is to be applied to the case from the outside thereof may be reduced to the greatest extent to further enhance the reliability of the device. The device of the present invention having a valve means provided between the case and the means for sucking the electrolyte so as to separate the electrolyte from the inside of the sucking means can enhance its proofness to atmospheric temperature as well as vibrations in the upper and the lower directions.

In the device of the present invention a circuit arranged at the side of a keeping relay is rendered operative when the prime mover is not operated and is shut off when the prime mover is operated, so that the current supply from the accumulator is stopped through the operation of the detecting device when the prime mover is not operated, while warning is given of anything unusual in the accumulator through the warning means when the prime mover is operated. Accordingly, even if there exist any conditions undesirable to the accumulator, such as an accident in the charging line or foregetting to turn off the lamps, the overdischarge of the accumulator can be avoided, thus protecting the accumulator and eliminating any chance that the prime mover cannot be started. Further, the detecting device of the present invention can indicate beforehand any accident in the charging line and whether the load capacity is proper or not, thus making it easy to maintain the accumulator in regard to charging and discharging the accumulator.

These and other objects as well as the merits of the present invention will be apparent from the following description with reference to the accompanying drawings, in which FIG. 1 is a longitudinal section of an embodiment of the present invention;

FIG. 2 is a sectional view taken along the line II — II in FIG. 1;

FIG. 3 is a sectional view taken along the line III — III in FIG. 1;

FIGS. 13 through 18 are longitudinal sections of a part of the case showing the performance of the case when the surface level of the electrolyte is under various conditions; and FIGS. 19 and 20 are circuit diagrams of warning means.

Figure 4:
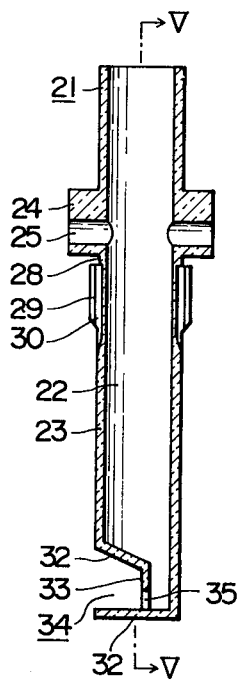
FIG. 4 is a longitudinal section of a case.
Figure 5:
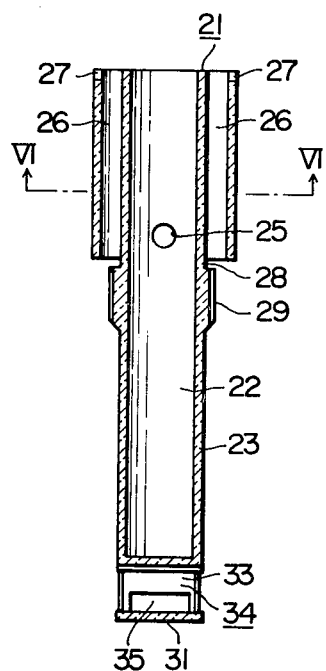
FIG. 5 is a sectional view taken along the line V — V in FIG. 4.
Figure 6:
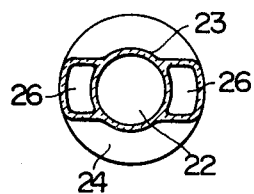
FIG. 6 is a sectional view taken along the line VI — VI in FIG. 5.

In FIGS. 1 and 2 showing an embodiment of the present invention, numeral 11 represents a floating member made of acid-proof synthetic resin such as ABS resin, polypropylene, and polyethylene and provided with a cylindrical hollow portion 12 therein so as to be floatable. To the top and at the center of the cylindrical hollow portion 12 is attached a supporting frame 13, which has a through-hole 13a and to the top of the supporting frame 13 is attached a permanent magnet or a magnetic material 14 such as iron. In the cylindrical hollow portion 12 are contained weights 15 so as to adjust the buoyancy of the floating member 11 and to balance the floating member 11. These weights 15 are made of material having specific gravity higher than that of the electrolyte, for example, balls of lead (of which the specific gravity is 11.3). The total weight of the weights 15 is adjusted in such a manner that the buoyancy of the floating member 11 becomes zero when the specific gravity of the electrolyte falls to a predetermined value, for example, a value at the time when the discharge of the electrolyte is about to expire. The temperature of the electrolyte changes in response to the change in atmospheric temperature and therefore the specific gravity of the electrolyte is changed accordingly. However, the floating member 11 made of polypropylene, polyethylene or the like is expanded or contracted by heat so as to follow the change in the specific gravity of the electrolyte, so that the change in the atmospheric temperature can be compensated, thus allowing incorrect operation of the device of the present invention to be avoided.

Numeral 21 represents a case made of same material as that of the floating member 11 and having a cylindrical portion 23 in which a hollow portion 22 is formed so as to contain the floating member 11 and the electrolyte therein. To the outer circumference and at the upper portion of the cylindrical portion 23 is attached an enlarged portion 24 of disc shape through which a hole 25 is provided so as to mount a switch. A pair of passages 26 through which gas is exhausted are provided at the both outer and upper sides of cylindrical portion 23 and extending from the top of the cylindrical portion 23 to the bottom of the enlarged portion 24, and cut-away portions 27 are provided at the upper ends of the passages 26. At the outer circumference of the cylindrical portion 23 below the enlarged portion 24 are provided a recess 28 of ring-shape and a thread 29 through which the device is attached to an accumulator and in which is provided a groove 30 communicating with the recess 28 and letting gas pass therethrough.

To the lower end of the cylindrical portion 23 is attached a bottom plate 31 of disc shape and a recess portion 34 is formed by a slanted wall 32 slanting from one side of the cylindrical portion 23 into the inside of the case 21 and by a vertical wall 33 extending from the slanted wall 32. In the lower end of the vertical wall 33 adjacent to the bottom plate 31 is provided a hole 35 through which the electrolyte passes.

Figure 7:
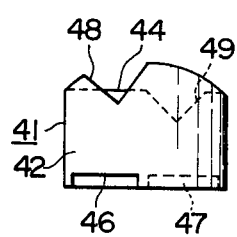
FIG. 7 is a front view showing a protector.
Figure 8:
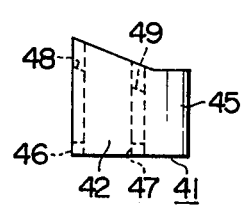
FIG. 8 is a side view of the protector.
Figure 9:
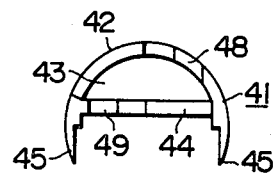
FIG. 9 is a plan view of the protector.

In the recess 34 located in front of the hole 35 at the lower end of the cylindrical portion 23 is arranged a protector 41. As shown in FIGS. 1 through 3, particularly in FIGS. 7 through 9, the protector 41 made of same material as that of the case 21 has an outer portion 42 which is so half-circular as to form the cylindrical shape of the case 21 integral to the case 21 and inside which is arranged a partition 44 to form a chamber 43 therebetween. Both ends of the outer portion 42 are formed to have portions 45 through which the outer portion 42 is attached to the case 21. Slits 46 and 47 are provided at staggered positions in the lower ends of the outer portion 42 and the partition 44. Cut-away portions 48 and 49 are provided in the upper ends of the outer portion 42 and the partition 44, the positions of the cut-away portions 48 and 49 corresponding to those of the slits 46 and 47, respectively. The protector 41 is attached through the portions 45 thereof to the recess 34 located in front of the hole 35 of the case 21 and, if desired, it may be fixed in the recess 34 by welding or using an adhesive. As constructed above, a chamber 43 is formed in front of the hole 35 provided in the lower end of the cylindrical portion 23 of the case 21 and other chamber 50 is also formed between the vertical wall 33 and the protector 41. The slits 46 and 47 serve mainly to let the electrolyte come in and out of the case 21 while the cut-away portions 48 and 49 to let bubbles of hydrogen gas or air. The slits 46 and 47 are located so as to be staggered relative to each other, and the same is the case of the cut-away portions 48 and 49, so as to form a non-linear line, so that the electrolyte may not flow in straight line and that any influence which is to be applied to the case 21 from the outside thereof may be reduced to the greatest extent. It is not always necessary to arrange the slits 46, 47 and the cut-away portions 48, 49 in staggered fashion, respectively, and they may be practically arranged in linear fashion.

To the top of the case 21 is attached a means 51 for sucking the electrolyte into the case 21. The means 51 has a base 52 of disc shape made of the same material as that of the case 21 and from the under side of the base 52 a ring-shaped portion 53 projects which is fitted into the case 21. In the outer circumference of the base 52 is provided an engaging groove 54. On the base 52 is mounted a resilient cap 55 made of high acid-proof material such as nitril rubber, in such a manner that the outer circumferential rim of the cap 55 is fixed between a clip 56 and the engaging groove 54 of the base 52. The cap 55, the case 21 and a valve bore 62 which will be described later comprise a squirt.

There is provided a valve means 61 in the center of the sucking means 51 for electrolyte. This valve means 61 comprises a valve bore 62 provided in the center of the base 52, a tapering valve seat 63 formed at the bottom of the valve bore 62 and having an opening portion 63a of a diameter larger than that of the valve bore 62, a valve rod 64 extending from the inner center of the cap 55 and having a diameter smaller than that of the valve bore 62, and a valve body 65 formed on the lower portion of the valve rod 64 passed through the valve bore 62 and having a diameter larger than that of the valve bore 62. The cap 55 and the valve means 61 are fixedly attached to the top of the cylindrical portion 23 of the case 21 by fitting the ring-shaped portion 53 into the top of the cylindrical portion 23. In this case, it may be arranged so that projections (not shown) are provided extending from the base 52 so as to fit into the passages 26 and to prevent the base 52 from rotating.

When the cap 55 is pressed by fingers and then released from the press by fingers, the electrolyte will be sucked into the case 21. In this case, the cap 55 is usually kept closed by the valve body 65 urged to the valve seat 63 due to the resiliency of the cap 55 and the valve body 65 is arranged to depart from the valve seat 63 when the cap 55 is pressed.

Under the condition that the floating member 11 is housed in the hollow portion 22 of the case 21, a magnetically sensing switch 71 of rod shape is pressed into the hole 25 which penetrates through the supporting frame 13 of the floating member 11. The magnetically sensing switch 71 comprises a switch body 72 fixedly accommodated in a switch case 73 and lead wires 74 extending outside the switch case 73, said lead wires 74 being connected to a power source or a warning means such as lamp and buzzer. The magnetically sensing switch 71 crossing through the through-hole 13a of the supporting frame 13 serves as a stopper for the floating member 11 in such a manner that when the floating member 11 rises the top of the cylindrical portion 12 contacts the underside of the switch case 73 and that when the floating member 11 falls the underside of the magnetic material 14 or the permanent magnet is brought into contact with the upper side of the switch case 73, thus defining the upward and downward movement of the floating member 11 within a distance corresponding to the height of the supporting frame 13, namely, between the upper side of the cylindrical portion 12 and the underside of the magnetic material 14 or the permanent magnet.

In FIGS. 1 and 2, numeral 81 represents an accumulator, 82 a liquid intake, 83 a plate and 84 electrolyte.

There will be now described how the device of the present invention is used.

As shown in FIGS. 1 and 2, the case 21 is screwed into the liquid intake 82 of the accumulator 81 through the thread 29 of the case 21, with a packing of ring shape made of nitril rubber or the like being arranged between the underside of the enlarged portion 24 and the upper side of the liquid intake 82. The packing 85 serves to seal the portion at which the device is attached to the accumulator as well as to attain the following function. Namely, in the device of the present invention the hole 35 through which the electrolyte comes into the case 21 is arranged to be adjacent to the top of the plate 83 of the accumulator 81 and the position of the hole 35 can be adjusted by changing the height at which the case 21 is attached to the intake 82 of the accumulator 81. In other words, the height of the case 21 relative to the accumulator 81 can be adjusted by changing the thickness or the number of the packing 85.

Figure 10:
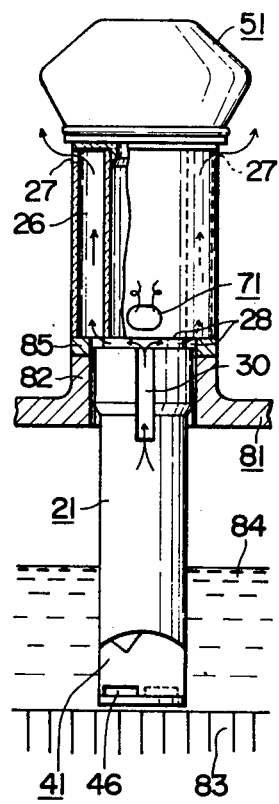
FIG. 10 is a side view of the embodiment, which is partly broken away, showing how gas is exhausted through the device.

The packing 85 seals the lower and outer circumference of the passage 26, he outer circumference of the recess 28 and the upper and outer circumference of the groove 30 so as to allow the gas generated in the accumulator 81 to flow through the groove 30, the recess 28 of ring shape and the passage 26, and to be exhausted through the cut-away portion 27, as shown in FIG. 10. The passage through which the gas flows is arranged to be long and curved as stated above, so that hydrogen gas may be exhausted, but that the electrolyte may not be leaked outside the accumulator 81. The magnetically sensing switch 71 is located outside the accumulator 81.

Figure 11:
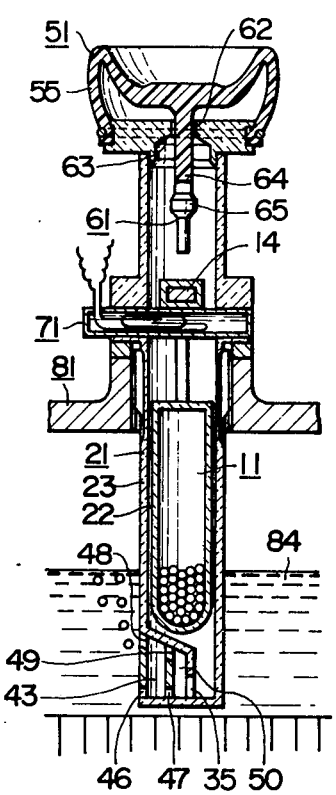
FIGS. 11 and 12 are longitudinal sections of the embodiment showing how the electrolyte is sucked.

When the cap 55 of the means 51 for sucking the electrolyte is a little pressed, the valve body 65 is released from the valve seat 63 to open the valve means 61. When further pressed, the cap 55 is deformed to force the air contained in the cap 55 through the space between the valve rod 64 and the valve bore 62 into the hollow portion 22 of the cylindrical portion 23 of the case 21, and then through the hole 35, the chambers 50 and 43, the slits 47 and 46, and the cut-away portions 49 and 48 to the outside of the case 21, as shown in FIG. 11.

Figure 12:
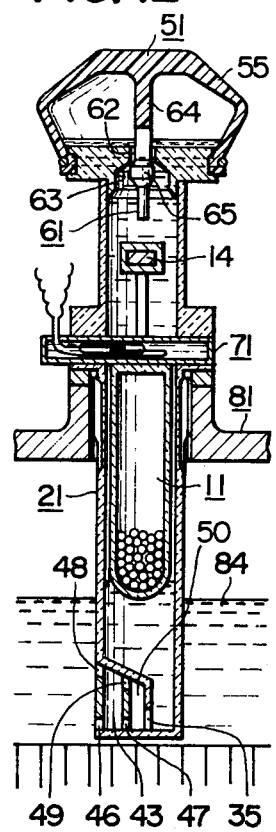

When the cap 55 is then released from the press, the electrolyte 84 is sucked through the slits 46 and 47, the cut-away portions 48 and 49, the chambers 43 and 50, and the hole 35 into the case 21, as shown in FIG. 12. At this time the floating member 11 in the case 21 is raised overcoming the magnetic attraction formed between the magnetic material or the permanent magnet 14 and the magnetically sensing switch 71 due to the flow of the electrolyte 84 sucked into the case 21 and the buoyancy of the floating member 11 till the floating member 11 is stopped by the magnetically sensing switch 71 which serves as the stopper for the floating member 11. Namely, the floating member 11 is raised to a level at which the magnetically sensing switch 71 is not influenced by the magnetic material or the permanent magnet 14 provided on the upper end of the floating member 11, and held by the buoyancy which is applied to the floating member 11 by the electrolyte 84. Accordingly, the floating member 11 is completely positioned in the electrolyte 84 and always in the upward buoyancy, thus allowing the floating member 11 to be left much more completely uninfluenced by the change in the liquid level than the usual floating members floating freely on the liquid surface.

If the electrolyte 84 is too rapidly sucked, air outside the case 21 will be also sucked. In order to avoid this, the space between the valve bore 62 and the valve rod 64 is determined. It is desirable that the volume of the electrolyte 84 sucked is such that a little of the electrolyte 84 comes into the cap 55 to enhance the sealing effect of the valve means 61 and to leave the case 21 with no air contained therein.

When the necessary volume of the electrolyte 84 is sucked, the valve body 65 is urged to the valve seat 63 so as to separate the air in the cap 55 from the electrolyte 84 in the case 21, completely.

Therefore, even if the accumulator 81 is arranged, for example, in the engine room of the car and atmospheric temperature rises to cause the electrolyte 84 in the cap 55 to be evaporated and the air in the cap 55 to be expanded by heat, the internal pressure in the cap 55 is only raised to still keep the electrolyte 84 in the case 21 not pressed down. Further, this rise of the internal pressure in the cap 55 causes the valve body 65 to be more strongly urged to the valve seat 63 and to thereby allow the device to attain its performance to the maximum extent. The arrangement that the air in the cap 55 is completely separated from the electrolyte 84 in the case 21 enables the latter to be left uninfluenced by the resiliency of the cap 55 even if the device is violently vibrated in the upper and the lower directions at the time of use thereof, thus resulting in no upward and downward movement of the latter. Being prevented from moving in the upper and the lower directions as stated above, the electrolyte 84 in the case 21 is never forced to flow out of the case 21 even if the device is vibrated in the upper and the lower directions under the condition that the hole 35 of the case 21 is exposed above the surface level of the electrolyte 84 in the accumulator 81. On the contrary, when the hole 35 of the case 21 is held in the electrolyte 84 in the accumulator 81, there is no anxiety that air is sucked into the case 21 due to the upward and downward movement of the electrolyte 84 in the case 21.

There will be now described how the device of the present invention is operated.

When the accumulator 81 is progressively discharged and the specific gravity of the electrolyte 84 is lowered to a value lower than the predetermined specific gravity of the floating member 11, the floating member 11 falls to approach the magnetic material or the permanent magnet 14 to the magnetically sensing switch 71 and to thereby render the magnetically sensing switch 71 operative. As a result, the warning means connected to the magnetically sensing switch 71 is operated to give a warning.

Figure 13:
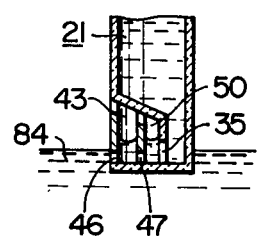

When the electrolyte 84 in the accumulator 81 reduces progressively to a surface level shown in FIG. 13 due to generation of gas (which contains water) at the time of charging of the accumulator 81 or due to natural evaporation of the electrolyte 84, a certain volume of the electrolyte 84 is held in the chambers 43 and 50 through capillarity.

Figure 14:
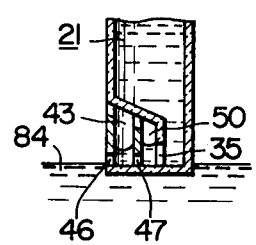

When the surface level of the electrolyte 84 in the accumulator 81 lowers adjacent to the slit 46 as shown in FIG. 14, hydrodynamic balance is lost causing only the electrolyte 84 contained in the outer chamber 43 to flow out.

Figure 15:
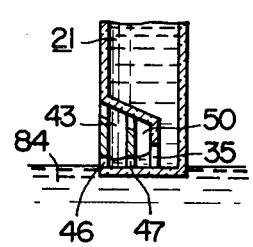

When the surface level of the electrolyte 84 in the outer chamber 43 is lowered adjacent to the inner slit 47 as shown in FIG. 15, the electrolyte 84 contained in the inner chamber 50 is then caused to flow out, and when the surface level of the electrolyte 84 in the inner chamber 50 is lowered adjacent to the hole 35, the electrolyte 84 in the case 21 is finally caused to flow out.

As stated above, the electrolyte 84 contained in the case 21 is arranged to flow out with a time interval from the time when the surface level of the electrolyte 84 in the accumulator 81 has lowered adjacent to the outer slit 46, and this time interval can be adjusted in the range of a few seconds to ten and a few seconds by changing the number and the size of the chambers 43 and 50 or the size of the slits 46 and 47.

When the electrolyte 84 in the case 21 is caused to flow out and to thereby lower the surface level thereof, the floating member 11 falls due to its weight to render the magnetically sensing switch 71 operative by the action of the magnetic material or the permanent magnet 14.

There often occur such cases that the surface of the electrolyte 84 in the accumulator 81 is slanted due to centrifugal force at the time when the car is turned thereby leaving the case 21 completely exposed above the surface of the electrolyte 84 as shown in FIG. 16, that the slanted surface of the electrolyte 84 is caused to approach the outer slit 46 as shown in FIG. 17, and that the wave-shaped surface of the electrolyte 84 is caused to fall to the outer slit 46 as shown in FIG. 18.

In the case shown in FIG. 16, the electrolyte 84 in the case 21 is prevented from flowing out on the same principle as the liquid contained in a usual squirt is prevented. Even if the case 21 held in such condition as shown in FIG. 16 is subjected to a violent vibration in traverse direction, the electrolyte 84 in the case 21 is prevented from easily flowing out because the electrolyte 84 in the chambers 43 and 50 is firmly held therein.

In the cases shown in FIGS. 17 and 18, the electrolyte 84 in the chambers 43 and 50 is caused to flow out little by little, but the electrolyte 84 which is able to flow out in these cases is not the one contained in the case 21 but the one contained in the chambers 43 and 50. When the surface of the electrolyte 84 in the accumulator 81 is again kept in normal condition, the same volume of electrolyte corresponding to that of the electrolyte 84 flowed out of the chambers 43 and 50 is instantly filled up therein, so that any of the electrolyte 84 in the case 21 is not caused to flow out. Further, even if hydrogen gas generated by the plates in the accumulator 81 and air bubbles generated due to vibration of the accumulator 81 come into the chambers 43 and 50 through the slits 46 and 47, they only pass through the chambers 43 and 50 to again be exhausted through the cut-away portions 48 and 49, and never come into the case 21.

There will be now described examples of the warning means used the device of the present invention.

FIG. 19 is a circuit diagram showing an example of the warning means. In FIG. 19 numeral 10 represents the detecting device, 81 the accumulator, and 91 a keeping relay of the self-holding type for controlling current from the accumulator 81, said keeping relay 91 being rendered operative by a setting coil 91a and a resetting coil 91b. Numeral 92 denotes a lamp or other load and 93 a change-over switch which changes over the circuit depending on whether the prime mover (not shown) is operated or not. A vacuum switch which is rendered operative using the load of an intake manifold of the prime mover is employed as the switch 93 and said switch 93 closes the side of the keeping relay 91 when the prime mover is stopped while said switch 93 closes the side of the warning means such as lamp or buzzer when the prime mover is operated. Numeral 95 represents a push button switch which serves to set the keeping relay 91 and numeral 96 denotes a release switch which serves to release the detecting device 10. Performance of the keeping relay 91 is held through a mechanical system, which is advantageous in that waste of current can be reduced.

In the case where the prime mover is stopped, the change-over switch 93 is in contact with the side of the keeping relay 91 and when anything unusual to the accumulator 81 occurs to render the detecting device 10 operative, the resetting coil 91b of the keeping relay 91 is operated to shut off the keeping relay 91 and to thereby stop discharging of the accumulator 81. On the contrary, in the case where the prime mover is operated, the change-over switch 93 is in contact with the side of the warning means 94 using the load of the intake manifold of the prime mover and when the detecting device 10 is rendered "ON" condition, the warning means 94 is operated to give a warning keeping the circuit of the load 92 closed.

When the warning means is operated, it is necessary to charge the accumulator, or to add the electrolyte in the accumulator, or to remove anything unusual from the accumulator. However, in a case of the car on which the device of the present invention is mounted, it often happens that such treatment as stated above can not be applied to the accumulator. In this case the release switch 96 is rendered to the "OFF" condition to temporarily stop the warning means such as a lamp or buzzer while the car is being driven, and then, treatment required will be applied at a place such as a car repair shop. In the case where the device is operated while the car is stopped, since the keeping relay 91 is in the "OFF" condition, the release switch 96 is opened while the push button switch 95 is depressed so as to set the keeping relay 91 and to thereby enable the car to be driven again. Therefore, if necessary, the car can be driven to a place at which anything unusual can be removed from the accumulator. In this case it is required that the accumulator 81 holds current to start the prime mover, and therefore it is desirable that the device of the present invention is set and operated in such manner.

FIG. 20 is a circuit diagram showing another example of the warning means. This example using an oil warning lamp circuit 92a inserted in the load 92 is intended to reduce the cost of the device of the present invention.

In FIG. 20 numeral 97 represents a hydraulic switch which is in "ON" condition when the prime mover is stopped and which is in "OFF" condition when the prime mover is operated. Numeral 98 denotes a rectifier, said rectifier being intended to open the circuit comprising the oil warning lamp, the resetting coil 91b, and the warning means 94 when the prime mover is operated, namely, when the hydraulic switch 97 is in "OFF" condition. Other components which are the same as those shown in FIG. 19 and the same numerals and description of these components are omitted.

In the case where the prime mover is stopped with the hydraulic switch 97 kept in "ON" condition and when anything unusual to the accumulator 81 occurs to render the detecting device operative, the resetting coil 91b of the keeping relay 91 is operated to shutt off the keeping relay 91 and to thereby stop discharging of the accumulator 81. On the contrary, in the case where the prime mover is operated with the hydraulic switch 97 kept in "OFF" condition and when the detecting device 10 is operated, the warning means 94 is rendered operative to give a warning keeping the keeping relay 91 closed. At the same time current is fed through the resetting coil 91b and the rectifier 98 to the oil warning lamp, but this current is not enough to render the resetting coil 91b operative, thus keeping the keeping relay 91 closed.

Instead of using the oil warning lamp circuit 92a it may be arranged so that a charge lamp circuit of a voltage regulator whose L terminal is connected to the device of the present invention is employed so as to use the opening and closing of the relay to render the device operative.

I claim:

1. In a control circuit for an accumulator which is adapted to supply an electrical load and to be employed with a prime mover;
   first means for controlling energization of said load from said accumulator;
   second means for providing a warning signal;
   third means responsive to the operative condition of said prime mover;
   and fourth means responsive to a fault condition in said accumulator, said third and fourth means cooperating when a fault condition occurs in said accumulator to cause said first means to prevent energization of said load when said prime mover is inoperative and to enable energization of said load and operation of said warning signal when said prime mover is operative.

2. A control circuit according to claim 1 wherein said fault condition is overdischarge of said accumulator.

3. A control circuit according to claim 1 wherein said accumulator has electrolyte therein and wherein said fault condition is low electrolyte therein.

4. A control circuit according to claim 1, wherein said first means includes a relay having relay contacts for connection in circuit between said accumulator and said load and having a resetting coil;
   wherein said fourth means includes a detecting device and a detecting switch controlled thereby;
   and wherein said third means includes change-over switch means for connecting said detecting switch to enable alternate energization of said resetting coil or said second means.

5. A control circuit according to claim 4 wherein said relay further comprises a setting coil for setting said relay contacts and a selectively operable setting switch for operating said setting coil.

6. A control circuit according to claim 5 including a selectively operable release switch for selectively disconnecting said second means.

7. A control circuit according to claim 4 wherein said fault condition is overdischarge of said accumulator.

8. A control circuit according to claim 4 wherein said accumulator has electrolyte therein and wherein said fault condition is low electrolyte therein.

9. In a control circuit for an accumulator for supplying an electrical load and for employment in association with a prime mover;
   a relay for controlling energization of said load by said accumulator, said relay including normally closed relay contacts connectable between said accumulator and said load and a resetting coil energizable to open said relay contacts;
   a warning signal device;

a detecting device including a normally open detecting switch in circuit with said relay contacts and closable in response to a fault condition in said accumulator;

and change-over switch means responsive to the operative condition of said prime mover, said change-over switch means having one position when said prime mover is inoperative wherein it connects said detecting switch to enable operation of said relay coil so that closure of said detecting switch effects energization of said resetting coil and having another position when said prime mover is operative wherein it connects said detecting switch to enable operation of said relay coil so that closure of said detecting switch enables energization of said relay coil and connects said detecting switch to effect operation of said warning signal device.

10. A control circuit according to claim 9 wherein said fault condition is overdischarge of said accumulator.

11. A control circuit according to claim 9 wherein said accumulator has electrolyte therein and wherein said fault condition is low electrolyte therein.

12. A control circuit according to claim 9 wherein said relay further comprises a setting coil for setting said relay contacts and a selectively operable setting switch for operating said setting coil.

13. A control circuit according to claim 12 including a selectively operable release switch selectively disconnecting said second means.

14. A control circuit according to claim 9 wherein said change-over switch means includes a change-over switch for connecting said detecting switch to said resetting coil or to said warning device.

15. A control circuit according to claim 9 wherein said change-over switch means includes a diode in circuit with said resetting coil and a change-over switch for connecting said diode to ground.

16. Apparatus comprising:
a prime mover having operative and inoperative states;
an electrical load;
an accumulator for supplying said load;
and control means for said accumulator including;
means indicative of the state of said prime mover;
a warning device;
and means responsive to a fault condition in said accumulator to prevent energization of said load by said accumulator if said fault condition occurs while said prime mover is in an inoperative state and to permit energization of said load by said accumulator and to effect operation of said warning device if said fault condition occurs while said prime mover is in an operative state.

17. A means for giving a warning relative to a fault condition in an accumulator used to supply a load and employed with a prime mover having operative and inoperative status, comprising: a detecting device for detecting the overdischarge of said accumulator as well as the surface level of the electrolyte contained in said accumulator, a keeping relay of the self-holding type for controlling the current supply from said accumulator, a switch arranged to operate to sense whether said prime mover is operated or not, and a warning means whereby, when said prime mover is stopped, said switch serves to close the keeping relay circuit so as to stop current supply from said accumulator by the operation of said detecting device while, when said prime mover is operated, said switch serves to open said keeping relay circuit so as to give through said warning means a warning relative to any accident in said accumulator by the operation of said detecting device.

* * * * *